United States Patent [19]
Maron et al.

[11] Patent Number: 5,892,860
[45] Date of Patent: *Apr. 6, 1999

[54] MULTI-PARAMETER FIBER OPTIC SENSOR FOR USE IN HARSH ENVIRONMENTS

[75] Inventors: Robert J. Maron, Cromwell, Conn.; Alan D. Kersey, Fairfax Station, Va.

[73] Assignee: CiDRA Corporation, Wallingford, Conn.

[*] Notice: This patent issued on a continued prosecution application filed under 37 CFR 1.53(d), and is subject to the twenty year patent term provisions of 35 U.S.C. 154(a)(2).

[21] Appl. No.: 786,704

[22] Filed: Jan. 21, 1997

[51] Int. Cl.$^6$ .................................................... G02B 6/00
[52] U.S. Cl. .............................. 385/12; 385/37; 385/38
[58] Field of Search ........................... 385/12, 37, 15, 385/13, 10, 38; 356/345, 347

[56] References Cited

U.S. PATENT DOCUMENTS

| | | | |
|---|---|---|---|
| 4,900,937 | 2/1990 | Dayton et al. | 250/483.1 |
| 5,042,898 | 8/1991 | Morey et al. | 385/37 |
| 5,163,321 | 11/1992 | Perales | 73/151 |
| 5,308,973 | 5/1994 | Odoni et al. | 250/227.17 |
| 5,315,110 | 5/1994 | Smith | 250/227.27 |
| 5,351,324 | 9/1994 | Forman | 385/37 |
| 5,357,806 | 10/1994 | Dennis et al. | 73/718 |
| 5,363,463 | 11/1994 | Kleinerman | 385/123 |
| 5,399,854 | 3/1995 | Dunphy et al. | 250/227.17 |
| 5,401,956 | 3/1995 | Dunphy et al. | 250/227.18 |
| 5,444,803 | 8/1995 | Kim et al. | 385/28 |
| 5,452,087 | 9/1995 | Taylor et al. | 356/352 |
| 5,485,745 | 1/1996 | Rademaker et al. | 73/151 |
| 5,495,237 | 2/1996 | Yuasa et al. | 340/854.6 |
| 5,499,533 | 3/1996 | Miller et al. | 73/152 |
| 5,548,116 | 8/1996 | Pandelisey | 250/256 |

FOREIGN PATENT DOCUMENTS

| | | | |
|---|---|---|---|
| 0210372 | 2/1987 | European Pat. Off. | G01D 5/26 |
| 0227556 | 7/1987 | European Pat. Off. | G01D 5/26 |
| 0404242 | 12/1990 | European Pat. Off. | G01D 5/26 |

OTHER PUBLICATIONS

*Fiber Grating Pressure Sensor With Enhanced Sensitivity Using a Glass–Bubble Housing*, by M. G. Xu, H. Geiger and J.P. Dakin—Electronics Letters, 18$^{th}$ Jan. 1996, vol. 32, No. 2, pp. 128–129.

"High–sensitivity intrinsic fiber–optic Fabry–Perot pressure sensor", Optics Letters/vol. 21, No. 8/Apr. 15, 1996, pp. 615–617.

*Primary Examiner*—Phan T.H. Palmer

[57] ABSTRACT

A sensor capable of measuring a number of physical parameters in a harsh environment includes a plurality of intrinsic fiber optic sensor elements formed within a core of an optical fiber, the optical fiber being disposed within a capillary tube made of a high strength, corrosion resistant material. The sensor is located at a distal end of the capillary tube, and the capillary tube is mounted in a monitoring location, such as mounted to the casing of an electrically submersible pump (ESP), such that the sensor can be utilized to measure physical parameters, including static and dynamic pressure, temperature, acceleration and acoustic signals, at the monitoring location. Each sensor is constructed such that a reference element, such as a rigid element, isolates a reference location in the optical fiber from mechanically induced strain. A Bragg grating sensing element is positioned with respect to the reference element, and responsive to an optical signal and to a strain associated with a respective measurand field for providing an optical sensing signal related to a magnitude of the respective measurand field.

36 Claims, 5 Drawing Sheets

MULTI-PARAMETER FIBER OPTIC SENSOR FOR USE IN HARSH ENVIRONMENTS

TECHNICAL FIELD

The present invention relates to optical sensors for measuring physical properties including static and dynamic pressure, temperature, acceleration and acoustic signals, and more particularly, to intrinsic fiber optic sensors packaged for use in extremely harsh environments.

BACKGROUND OF THE INVENTION

In the extraction of oil from earth boreholes, it is often required to provide some form of artificial pumping power to force the oil being extracted up the borehole to the surface where it can be collected. In such producing wells, electrically powered pumps located at the bottom of the wells are often employed. Such devices, called electrical submersible pumps (ESPs), are typically first installed after the well has been drilled and while it is being prepared to be put into production. ESPs are located at the bottom end of a long length of tubing, called the production tubing string, and are powered by electrical cables deployed from the surface. These cables are typically armored, shielded, or contained in special tubing for protection from mechanical damage during assembly and operation.

The ESPs pump oil into the production tubing string through which it flows to the surface. Failure of an ESP requires its removal from the well for replacement or repair. This is a very expensive operation, not only because of the high costs of the equipment itself and the manpower required in remote and hostile locations, but also because of the oil production lost while the well is not producing oil. Thus, reliability of the ESP is of utmost importance.

It is well known to monitor the pump current and control pump operation based upon a 24 hour "ammeter chart". Such pump operation is described in "Recommended Practice for Operation, Maintenance and Troubleshooting of Electric Submersible Pump Installations", American Petroleum Institute, Third Edition, Nov. 1, 1994. While this is one of the most common methods of monitoring ESP performance, the information is limited with respect to the physical characteristics of both the ESP and the environment in which the ESP is located. It is also known to install electrical pressure and temperature sensors with some ESPs to provide the operators on the surface with information about the pumps performance, which then allows the operators to control various parameters, such as pump speed, which can increase the life of the pump. Increasing the pump life until a scheduled maintenance, when other scheduled downhole work can be accomplished at the same time, is highly desirable, since it minimizes costs due to lost oil production.

The presently used electrical pressure and temperature sensors are limited for several reasons. The on-board electronics of such sensors must operate in a very hostile environment, which includes high temperature, high vibration and high levels of external hydrostatic pressure. Such electrical sensors also must be extremely reliable, since early failure entails a very time consuming and expensive well intervention. Electronics, with its inherent complexity, are prone to many different modes of failure. Such failures have traditionally caused a less than acceptable level of reliability when these electrical sensors are used to monitor ESPs.

There are numerous other problems associated with the transmission of electrical signals within wellbores. In general, there are many problems encountered in providing an insulated electrical conductor for transmitting electrical signals within wellbores. Such electrical conductors are extremely difficult to seal against exposure to wellbore fluids, which are at high temperatures, high pressures, and present a very corrosive environment. Such electrical conductors, once damaged by the fluids which penetrate the insulating materials around the electrical conductors, will typically short electrical signals. Additionally, electrical transmissions are subject to electrical noises in some production operations.

It is also known to use optical interferometers for the measurement of wellbore conditions, such as downhole wellbore pressures and temperatures. However, optical interferometers are typically very sensitive to temperature variations and the downhole temperature of a specific position within a wellbore will change over time, depending upon different factors such as, for example, production rates, the types of fluids produced over the life of the well, and downhole wellbore conditions. A factor affecting wellbore temperature is the injection of various treatment fluids from the surface. Such treatment fluids typically enter the wellbore at surface-ambient temperature and therefore cause substantial temperature fluctuations. Even optical interferometers designed of special material or construction are subject to inaccuracies because of the harsh borehole environment and because of the very tight tolerances in such precision equipment.

Therefore, a reliable system is needed for accurately measuring the physical properties of a harsh environment, such as a borehole. Additionally, such a system should be capable of accurately measuring physical parameters associated with a device, such as an ESP, located in the harsh environment.

SUMMARY OF THE INVENTION

An object of the present invention is to provide an improved sensor for accurately monitoring multiple physical properties, including static and dynamic pressure, temperature, acceleration and acoustic signals, in an extremely harsh environment.

A further object of the invention is to provide such a sensor which is particularly useful for accurately monitoring multiple physical properties within a wellbore of an oil and/or gas well.

Another object of the present invention is to provide such a sensor which is useful for monitoring the performance of electric submersible pumps, and particularly electric submersible pumps utilized in harsh environments.

A still further object of the present invention is to provide such a sensor which is implemented utilizing intrinsic fiber optic sensors.

According to the present invention, a sensor capable of measuring a number of physical parameters in a harsh environment includes a plurality of intrinsic fiber optic sensor elements formed within a core of an optical fiber, the optical fiber being disposed within a capillary tube made of a high strength, corrosion resistant material, such as stainless steel, which is highly resistant to corrosion, pressure, and temperature effects of a high-pressure, high-temperature and corrosive environment. The sensor is located at a distal end of the capillary tube, and the capillary tube is mounted in a monitoring location, such as mounted to the casing of an electrically submersible pump (ESP), such that the sensor can be utilized to measure physical parameters, including static and dynamic pressure, temperature, acceleration and acoustic signals, at the monitoring location.

In further accord with the present invention, the sensor includes a pressure sensor, a vibration sensor, and a temperature sensor for monitoring physical parameters at the mounting location. Each sensor is constructed such that a reference means, such as a rigid element, isolates a reference location in the optical fiber from mechanically induced strain. A Bragg grating sensing element, such as a Bragg grating point sensor, a resonant cavity formed with multiple Bragg gratings, or a lasing element formed with multiple Bragg gratings, is positioned with respect to the reference means, and responsive to an optical signal and to a strain associated with a respective measurand field for providing an optical sensing signal related to a magnitude of the respective measurand field. For the temperature sensor, the Bragg grating sensing element is placed directly in the reference means. For pressure and vibration sensing, the Bragg grating sensing element is positioned between a displacement means and the reference means. The displacement means places an axial force on the optical fiber and thereby produces a strain in the Bragg grating.

In still further accord with the present invention, the pressure sensor includes a cavity, formed by the presence of a rigid member within the capillary tube, with a low-bulk modulus material optionally placed within the cavity and bonded to the optical fiber length within the cavity. A Bragg grating is located in the optical fiber along the cavity axis, and the distal end of the fiber is terminated in an antireflective manner so as to prevent interference with the reflected wavelengths from the Bragg grating sensor element. A diaphragm covers the end of the capillary tube to protect the fiber from mechanical and corrosive damage, the diaphragm being attached to the end of the capillary tube by appropriate means, such as welding, to achieve a hermetic seal. Variations in pressure cause deflections in the diaphragm thereby compressing the low-bulk modulus material, which in turn causes an axial compression of the Bragg grating. This axial strain in the Bragg grating causes a decrease in grating spacing thus changing the wavelength of light reflected back to a proximal end of the fiber which is interconnected to a sensing device, and the variations in wavelength are directly related to pressure applied to the distal end of the tube at the diaphragm to thereby provide an indication of pressure.

In still further accord with the present invention, a vibration sensor is formed within the capillary tube by a low-bulk modulus material attached on one end to a rigid member and attached on another end to a rigid mass. The rigid member is attached to both the fiber and the capillary tube while both the low-bulk modulus material and the rigid mass are not attached to the tubing. The fiber extends through and is attached to the low-bulk modulus material and the rigid mass. Within the axial extent of the low-bulk modulus material is located a Bragg grating. Vibrations along the axis of the capillary tube produce a force which accelerates the rigid mass to thereby produce a force which acts to expand and compress the low-bulk modulus material, which in turn causes axial stretching and compression of the Bragg grating sensor. Therefore, the device of the invention acts as an accelerometer which shifts the wavelength of light reflected by the Bragg grating to thereby provide an indication of vibration.

According still further to the present invention, a temperature sensor is formed by disposing a Bragg grating within a rigid element which is disposed in the capillary tubing. The rigid element is attached to both the tube and the fiber and effectively isolates the Bragg grating from strain due to external pressure and vibration such that the Bragg grating responds to temperature variations only for changing the reflective pattern of the Bragg grating.

The recent development of intrinsic fiber optic sensors which utilize strain-sensitive intracore Bragg gratings offers the possibility of constructing very small, rugged, and reliable sensors. Such sensors can be made very small in size, which allows several to fit within a confined space, such as the casing of an ESP. Their intrinsic sensing capability, which requires no failure-prone downhole electronics, also provides an extremely high level of reliability that far surpasses conventional electrical sensors. An additional advantage of Bragg gratings is that the sensed information is wavelength encoded, which makes them relatively insensitive to variations in the light intensity caused by light source degradation over time, and losses in connectors, etc. Wavelength encoding also enables several sensors to be easily multiplexed along the same optical fiber, using for example the well-known technique of wavelength division multiplexing (WDM). Such sensors are suitable for use in very hostile and remote environments, such as found in earth boreholes from which oil or gas is being extracted.

The foregoing and other objects, features and advantages of the present invention will become more apparent in light of the following detailed description of exemplary embodiments thereof, as illustrated in the accompanying drawings.

DETAILED DESCRIPTION OF THE INVENTION

The present invention utilizes fiber optic sensors for measuring fluid pressure (static and dynamic), temperature, and vibration. In particular, the present invention utilizes resonant structures, called Bragg gratings, that are disposed at multiple locations within the waveguiding core of an optical fiber.

Figure 1:
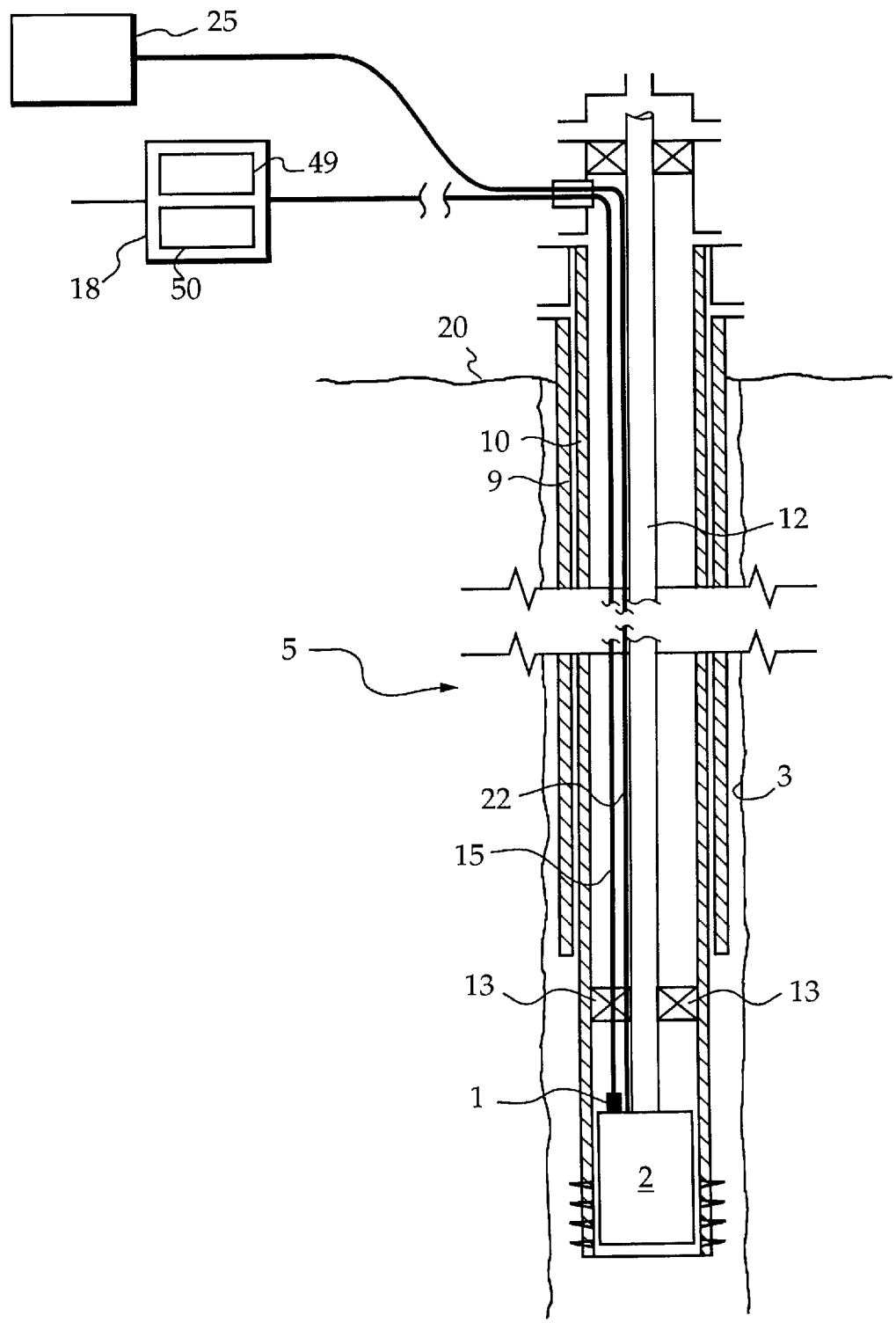
FIG. 1 is a longitudinal cross-sectional view of a wellbore which schematically illustrates the fiber optic intrinsic sensor of the invention interconnected to an electrically submersible pump.

Referring now to FIG. 1, the intrinsic fiber optic sensor elements utilized in accordance with the invention are disposed in a sensor 1 which is mounted in a mounting location, such as to the casing of an electrically submersible pump 2 within a wellbore 3 of an oil and/or gas well 5. Within the wellbore 3 are casing strings 9, 10, production tubing 12, and production packers 13. The optical sensor 1 is interconnected by an optical fiber assembly 15 with optical signal processing equipment 18. The optical signal processing equipment 18 is located above the surface 20 of the wellbore 3. The electrical submersible pump 2 is interconnected by an electrical cable 22 to an electrical submersible pump power supply and controller 25, which is also located above the surface 20 of the wellbore 3.

Figure 2:
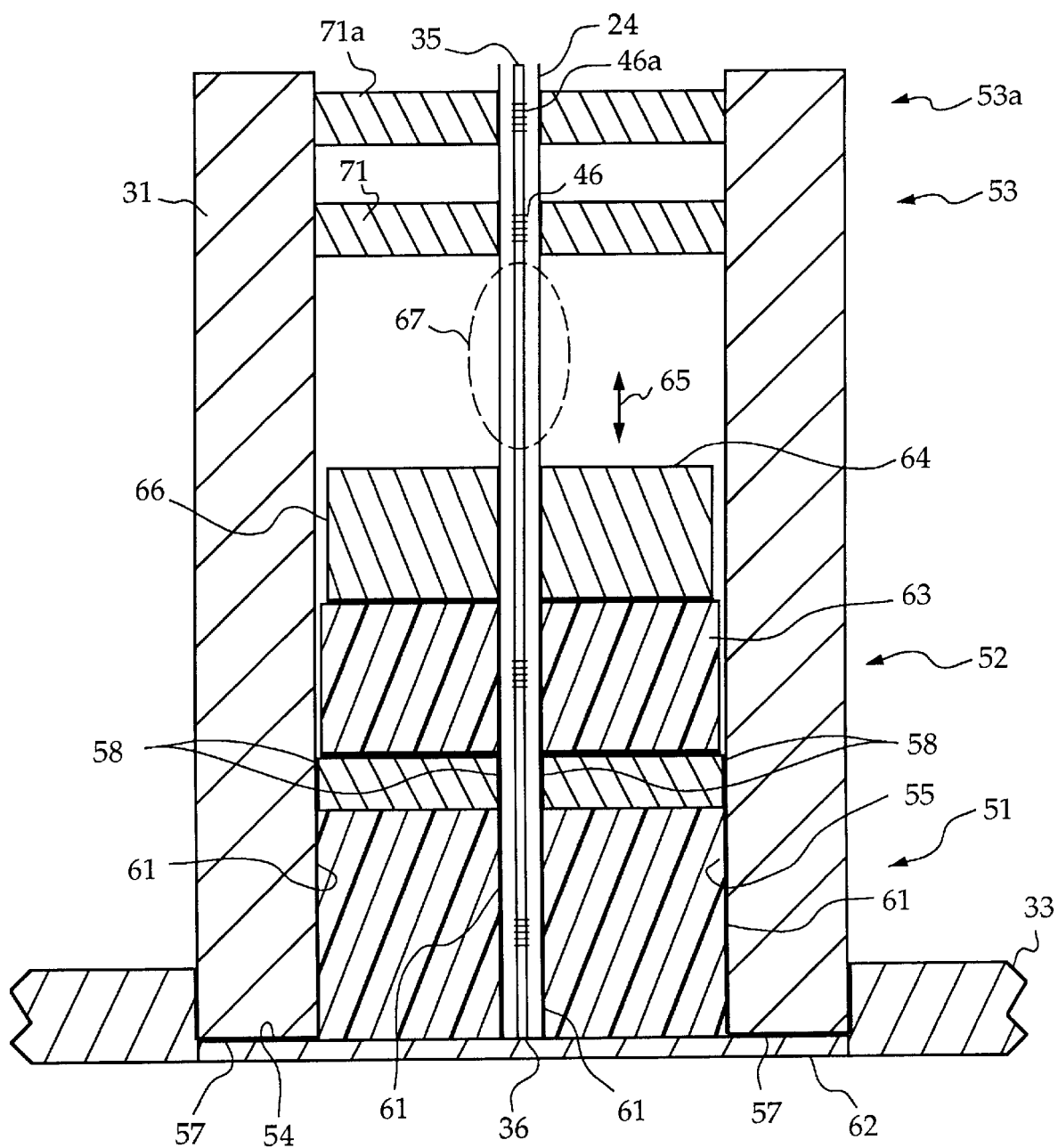
FIG. 2 is a more detailed schematic block diagram of the fiber optic intrinsic sensor of FIG. 1.

Referring now to FIG. 2, the optical fiber assembly 15 includes an optical fiber 24 which is protected from mechanical damage by placing it inside a capillary tube 31 made of a high strength, rigid walled, corrosion-resistant material, such as stainless steel. The tube 31 is attached by appropriate means, such as threads at 32, a weld, or other suitable method, to the structure 33 which it is monitoring, such as the casing of the ESP 2. The optical fiber 24 extends from the surface 20 (FIG. 1) of the well and contains a light guiding core 35 which guides light along the fiber 24. Within the core 35 at a distal end 36 of the fiber 24, are located three Bragg gratings, 46, 47, and 48, each of which acts as a resonant cavity, and each of which acts as a sensor. Each Bragg grating 46, 47, 48 is constructed so as to reflect a particular wavelength or frequency of light which is propagating along the core 35, back in the direction of the light source from which it was launched. Each of the particular frequencies is different from the other such that each Bragg grating 46, 47, 48 reflects a unique frequency. Referring also to FIG. 1, excitation light may be provided by a broadband light source 49, such as a light emitting diode (LED) located within the optical signal processing equipment 18. As discussed in greater detail below, the Bragg gratings 46, 47, 48 are used to implement the multi-parameter sensor of the invention, including a temperature sensor 53, an acceleration (vibration) sensor 52, and a pressure sensor 51, respectively.

Referring also to FIG. 1, connected between the optical fiber assembly 15 and the optical signal processing equipment 18 may be tubing delivery equipment (not shown) for delivering the optical fiber 24 within the capillary tubing 31 down the borehole 3. The tubing delivery equipment provides for the delivery of the capillary tubing 31 and fiber 24 down the borehole 3, and for the delivery of optical signals between the optical signal processing equipment 18 and the fiber assembly 15, either directly or via interface equipment (not shown) as required.

Bragg gratings (fiber gratings) are well suited for use as sensor elements. When a fiber grating is illuminated, it reflects a narrow band of light at a specified wavelength. However, a measurand, such as strain induced by pressure or temperature, will induce a change in the fiber grating spacing, which changes the wavelength of the light it reflects. The value (magnitude) of the measurand is directly related to the wavelength reflected by the fiber grating and can be determined by detecting the wavelength of the reflected light.

The optical signal processing equipment 18 includes, at a minimum, the broadband source of light 49, such as the light emitting diode (LED), and appropriate equipment for delivery of signal light to the Bragg gratings 46, 47, 48 included within the core 35 of the optical fiber 24. Additionally, the optical signal processing equipment 18 includes appropriate optical signal analysis equipment 50 for analyzing the return signals from the Bragg gratings 46, 47, 48.

Figure 3:
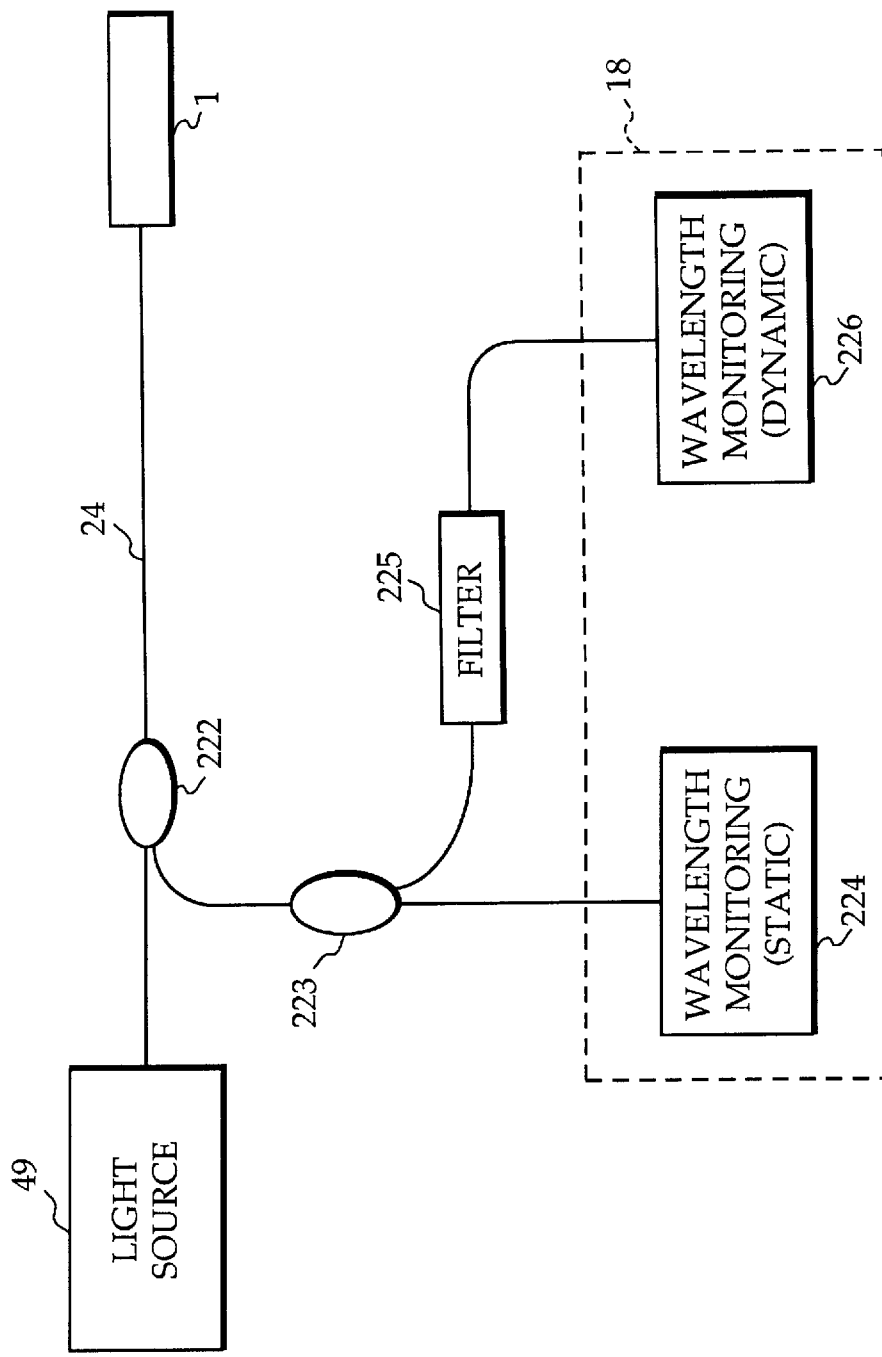
FIG. 3 is a schematic bock diagram of optical signal processing equipment utilized to analyze optical signals provided by the fiber optic intrinsic sensor of FIGS. 1 and 2.

FIG. 3 shows an arrangement for monitoring the wavelength shifts produced by the Bragg grating sensors 46, 47, 48 to provide both static pressure and temperature monitoring along with high resolution dynamic sensing for acceleration (vibration) and dynamic pressure (acoustic) parameters. The fiber 24 is coupled to the sensor 1 via the stainless steel capillary tube 31. The sensor 1, located at the distal end of optical fiber 24, contains the Bragg gratings 46, 47, and 48 each of which acts as a resonant reflector, and each of which operates as a sensor mounted as to respond in a manner described in greater detail below.

Light from the broadband optical source 49 is coupled to the fiber 24 via a coupler 222. This coupler 222 directs light to the sensor assembly 1, and directs the reflected optical components from the Bragg grating sensors 46, 47, 48 to the optical signal processing equipment 18 including wavelength monitoring sub-systems, 224 and 226. One of the wavelength monitoring systems 224 allows for the detection of wavelength shifts of the Bragg grating elements using an 'absolute' approach for static parameter monitoring (e.g. pressure & temperature). The other wavelength monitoring system 226 provides for detecting weak dynamically induced shifts for vibration and dynamic pressure monitoring.

In order to monitor static wavelength shifts, the returned optical components are directed into an optical wavelength analyzer 224, such as a scanning narrowband filter, which produces a measure of the Bragg wavelength of the signal light reflected by the Bragg gratings 46, 47, 48. Static pressure can be deduced from the differential shift of the Bragg wavelengths produced by Bragg gratings 46 and 48, whereas the temperature is determined directly from a measure of the Bragg wavelength of Bragg grating 46.

A portion of the returned optical components is split off, using a coupler 223, to an alternative wavelength discriminator 226 to thereby provide high resolution monitoring of wavelength shifts. In order to separate the responses of the different gratings 46, 47, 48, a portion of the returned optical components from the gratings are directed to a wavelength filter or router 225. This device separates the optical signals produced by each Bragg grating by means of selective filtering. The pass-bands of this device are wide enough to ensure that under normal operating conditions (full temperature & pressure range), the optical signal produced by, for example grating 47 is always passed. The outputs of the router can then be analyzed using a sensitive wavelength discriminators 226 to determine wavelength modulation effects due to vibration, dynamic pressure, or acoustic information. By tuning the filter 225 passband, the separate gratings in the system can be analyzed individually. Alternatively, a wavelength division demultiplexer could be used to separate the wavelength components onto separate fibers which could then be each analyzed via separate high resolution wavelength discriminators. An example of the type of wavelength discriminators suitable for this purpose is the interferometric detection approach described in U.S. Pat. No. 5,361,130, the disclosure of which is incorporated herein by reference.

Although a specific embodiment of the optical signal processing equipment 18 is described above, other optical signal analysis techniques may be used with the present invention such as the necessary hardware and software to implement the optical signal diagnostic equipment disclosed in U.S. Pat. Nos. 4,996,419; 5,401,956; 5,426,297; and/or U.S. Pat. No. 5,493,390, the disclosures of which are incorporated herein by reference.

As is well known in the art, there are various optical signal analysis approaches which may be utilized to analyze return signals from Bragg gratings. These approaches may be generally classified in the following four categories:

1. Direct spectroscopy utilizing conventional dispersive elements such as line gratings, prisms, etc., and a linear array of photo detector elements or a CCD array;
2. Passive optical filtering using both optics or a fiber device with wavelength-dependent transfer function, such as a WDM coupler;
3. Tracking using a tuneable filter such as, for example, a scanning Fabry-Perot filter, an acousto-optic filter such as the filter described in the above referenced U.S. Pat. No. 5,493,390, or fiber Bragg grating based filters; and 4. Interferometric detection.

The particular technique utilized will vary, and will depend on the Bragg wavelength shift magnitude (which depends on the sensor design) and the frequency range of the measurand to be detected.

As will be further understood by those skilled in the art, the optical signal processing equipment may operate on a principle of wave-division multiplexing as described above wherein each Bragg grating sensor is utilized at a different passband or frequency band of interest. Alternatively, the present invention may utilize time-division multiplexing for obtaining signals from multiple independent sensors, or any other suitable means for analyzing signals returned from a plurality of Bragg grating sensors formed in a fiber optic sensor string.

In the example of the present invention, the sensor 1 includes three separate sensor elements formed therein. The sensor 1 includes a pressure sensor 51, a vibration sensor 52, and a temperature sensor 53, as described above.

The pressure sensor 51 is constructed as follows. The optical fiber 24 extends to a distal end 54 of the capillary tube 31. Above the distal end 54 of the capillary tube 31, a cavity 55 is formed by the presence of a rigid member 59 positioned within the capillary tube 31 and spaced from the distal end 54 of the capillary tube 31. The rigid member 59 may be made of a corrosion resistant material such as stainless steel or beryllium copper. The rigid member 59 is attached 58 to both the internal surfaces of the tube 31 and the surface of the optical fiber 24 by a suitable adhesion method such as utilizing an adhesive compound, mechanical attachment (shrink or pressure fit), welding of a metal coated fiber to a metallic rigid member, etc. Therefore, at the attachment point to the rigid member 59, the optical fiber is effectively isolated from pressure and vibration effects. The attachment point acts as an effective reference point for pressure variations measured by the pressure sensor 51 of the invention.

The cavity 55 is located between the rigid member 59 and the distal end 54 of the capillary tube 31. A low bulk modulus material 60 is placed within the cavity 55, and is also bonded 61 to the optical fiber 24 length within the cavity 55, for example, using an adhesive compound. The low bulk modulus material 60 may be made of a polymer material, such as a polyurethane, e.g. URALITE 3140. The low bulk modulus material 60 may also be bonded 61 to the internal surfaces of the tube 31.

One of the Bragg gratings 48 is located generally in the center of the cavity 55. The distal end 36 of fiber 24 is terminated in an anti-reflective manner, so as to prevent interference with the reflected wavelengths from the Bragg gratings 46, 47 and 48. For example, the distal end 36 of the fiber 24 may be cleaved at an angle so that the end face is not perpendicular to the fiber axis. Alternatively, the distal end 36 of the fiber 24 may be coated with a material that matches the index of refraction of the fiber, thus permitting light to exit the fiber without back reflection, and be subsequently disbursed in the index-matching material.

A thin diaphragm 62 is located over the end of the capillary tube 31 and the low bulk modulus material 60. The diaphragm 62 is made of a high strength corrosion resistant material, such as stainless steel or beryllium copper. Such materials also should exhibit very low mechanical hysteresis. The diaphragm 62 serves to protect the fiber 24 from mechanical and corrosive damage, and is attached 57 to the end of capillary tube 31 by appropriate means, such as welding, to a achieve a hermetic seal.

The pressure to be sensed causes the diaphragm 62 to deflect, compressing the low bulk modulus material 60, which in turn causes an axial compression of the Bragg grating 48 (with respect to the reference point in the rigid member 59). This axial strain in the Bragg grating 48 causes a decrease in the grating spacing, thus changing the wavelength of light reflected back to the optical signal processing equipment 18, as described above. This change in wavelength seen at the optical signal processing equipment 18 is directly related to the applied pressure on the diaphragm 62 (as sensed by the Bragg grating 48). The sensor functions as a pressure sensor, wherein a wavelength shift in light reflected by the Bragg grating 48 is proportional to applied pressure. The wavelength shift is detected by appropriate optical signal analysis equipment 50 located within the optical signal processing equipment 18.

The vibration sensor 52 is constructed as follows. Another resiliently deformable element 63 of low bulk modulus material is attached to the opposite side of the rigid member 59 from the previously mentioned low bulk modulus material 60. Although not required, the low bulk modulus material 63 may be attached to the inside of the capillary tube 31 to prevent vibration in directions other than along the common axis of the capillary tube 31 and fiber 24. The fiber 24 extends through and is attached to the element 63. Within the axial extent of the element 63 is located one of the Bragg gratings 47. Another rigid element 64, preferably of relatively high mass, is attached to the element 63. The rigid element of high mass (rigid mass) 64 is utilized as a proof mass in the vibration (acceleration) sensor 52, and therefore is not attached to the inside of the capillary tube 31 to allow relative movement therebetween. The rigid mass 64 is preferably made of a corrosion resistant material having a coefficient of thermal expansion that closely matches the coefficient of thermal expansion of the capillary tube 31 to prevent binding therebetween. The rigid mass 64 may be coated with a low coefficient-of-friction coating 66, such as polytetra-fluorethyene (PTFE), to prevent adhesion to the inside wall of the capillary tube 31 or mechanical wear due to relative motion. Alternatively, the inside surface of the capillary tube may be coated with a low coefficient-of-friction coating in the area of the rigid mass 64. Although not required, the rigid mass 64 may be attached to the fiber 24. At a minimum, the rigid mass 64 is attached to the element 63.

When the sensor 52 is subjected to vibration along the axis of the capillary tube 31, the rigid mass 64 is accelerated in the direction 65 as shown with respect to the rigid member 59, producing a force which acts to expand and compress the element 63. This expansion and compression in turn causes an axial expansion and compression of the Bragg grating 47. As discussed above with respect to the pressure sensor 51, this causes a change in the wavelength of light reflected by the Bragg grating 47, which can be detected by the optical signal processing equipment 18. Thus, the device functions as an accelerometer, with the shift in wavelength of light reflected by the Bragg grating 47 being proportion to the applied acceleration.

The rigid mass 64 is separated from the internal surface of the capillary tube 31 by an annular space 68, which permits the rigid mass 64 to move freely with respect to the capillary tube 31. The annular space 68 also helps prevent binding between the capillary tube 31 and the rigid mass 64 due to differences in thermal expansion therebetween. The length of the fiber 24 in a region 67 immediately above the rigid mass 64 forms a strain relief consisting, for example, of a loop of excess length of fiber, or other known means, to avoid transmitting the strain created on the Bragg grating 47 by acceleration of rigid mass 64 to Bragg grating 46, which is intended to sense only temperature, as described below.

The temperature sensor 53 is constructed as follows. The Bragg grating 46 is located in a passage through a rigid element 71. This rigid element 71 effectively isolates the Bragg grating 46 from strain due to external pressure and vibration. Since the Bragg grating 46 is effectively isolated from the effects of strain on grating spacing associated with pressure and vibration, the Bragg grating 46 responds only to the effects of temperature, and acts as a temperature sensor only.

Since the acceleration sensor Bragg grating 47, and the pressure sensor Bragg grating 48 are also sensitive to both temperature and strain, the output of temperature sensor Bragg grating 46 can be used to cancel the effects of temperature in the Bragg gratings 47 and 48. Thus, the acceleration and pressure measurements may be temperature compensated in the optical signal processing equipment 18.

As illustrated in FIG. 1, if multiple spaced apart Bragg gratings, 46, 46*a* are imbedded in respective spaced apart rigid elements 71, 71*a*, these multiple temperature sensors 53, 53*a* may be used to provide a temperature gradient or profile of the environment.

Due to various non-linear effects associated with materials, construction, etc., and to geometrical, tolerance, and other variations which occur during manufacturing and assembly, linear temperature compensation alone may not be sufficient to produce a linear sensor. Therefore the device may be further characterized over temperature, allowing a correction of output for temperature by means of curve fitting, look-up table, or other suitable means.

Figure 4:
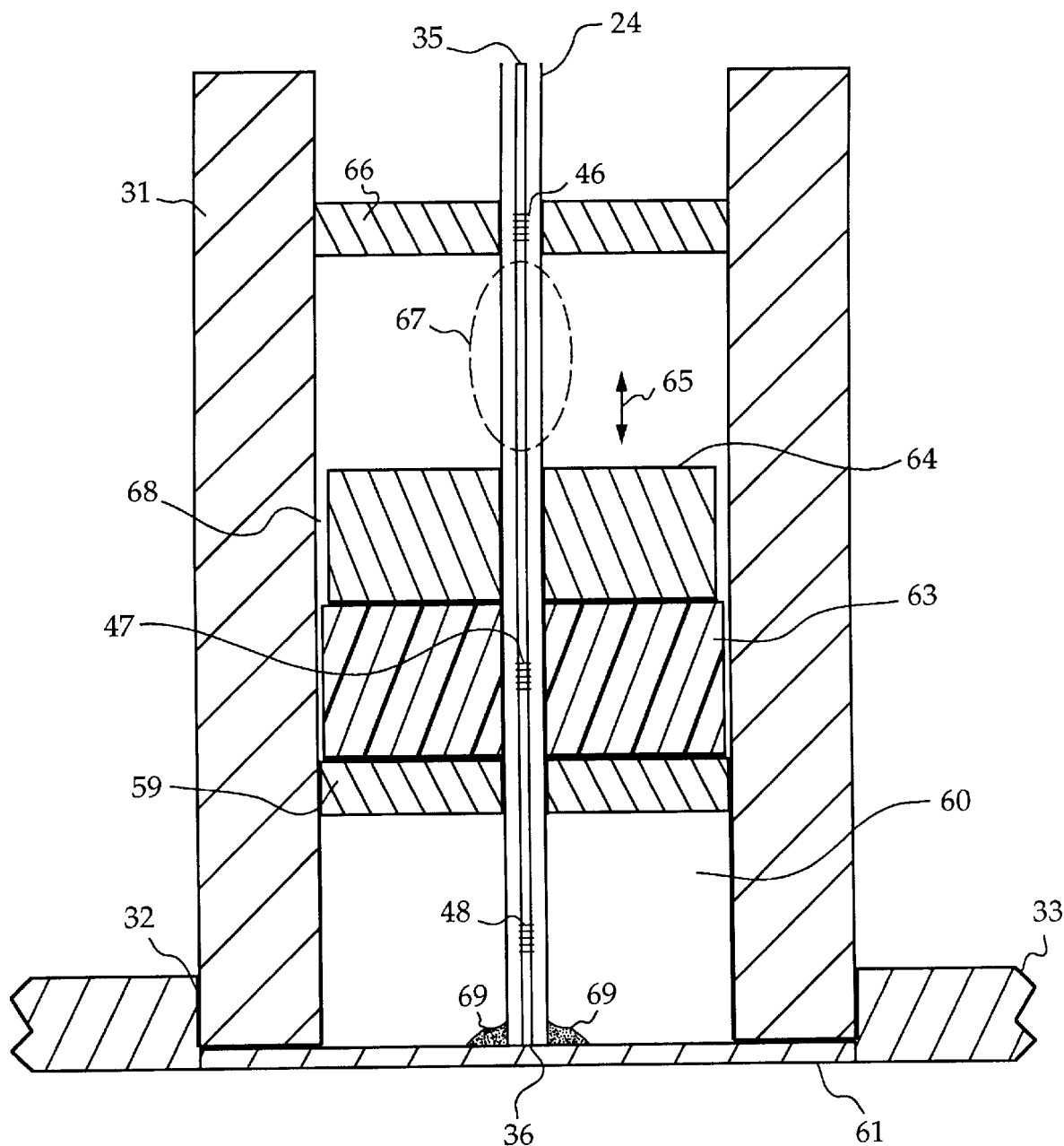
FIG. 4 is a schematic block diagram of a second embodiment of the fiber optic intrinsic sensor of FIG. 1.

The invention is described above as utilizing a low-bulk modulus material 60 in the cavity 55 formed between the rigid member 59 and the distal end 57 of the capillary tube 31. However, as illustrated in FIG. 4, in a second embodiment of the pressure sensor 52, the fiber 24 containing the pressure sensing Bragg grating 48 is suspended between the rigid member 59 and the diaphragm 62. This arrangement provides for a high degree of sensitivity to changes in pressure as reflected by movement of the diaphragm 62.

Referring to FIG. 4, the optical fiber 24 extends to the distal end 57 of the capillary tube 31. The low bulk modulus material 60 (FIG. 2) is eliminated from the cavity 55, such that the cavity 55 formed by the diaphragm 62 and the rigid member 59 is empty, except for the length of optical fiber 24 containing the pressure sensing Bragg grating 48. The fiber 24, which is rigidly attached to the rigid member 59 as described above, is also rigidly attached at an attachment point 69 to the diaphragm 62, for example by a high strength adhesive, a weld, or other suitable adhesion method. The Bragg grating 48 is located along the cavity axis as shown. The distal end 36 of the fiber 24 is terminated in an anti-reflective manner. The diaphragm 62 is attached to the end of the capillary tube 31 by appropriate means, such as welding, to achieve a hermetic seal.

The pressure to be sensed causes the diaphragm 62 to deflect an amount dependent on the magnitude of the pressure change and the diaphragm material, thickness and diameter. Deflection of the diaphragm 62 causes a direct change in the strain-state of the fiber 24 held between the rigid member 59 and the diaphragm 62, thereby altering the Bragg resonance wavelength of the Bragg grating 58. The action of compressing the Bragg grating sensor 48 can lead to a buckling effect in the fiber 24, between the rigid member 59 and the diaphragm 62, if unsupported. To overcome this, the fiber 24 held between the rigid member 59 and the diaphragm 62 is mounted under an initial axial tension (bias tension). This bias tension in the fiber 24 results in an offset of the resonance of the Bragg grating 58, thus changing the wavelength of light reflected back to the proximal end of the fiber. Changes in the pressure field then applied to diaphragm 62 thus results in a reduction in the bias tension in the fiber 24 and a shift in the Bragg wavelength of the Bragg grating sensor 58, which as previously discussed can be detected at the proximal end of the fiber by appropriate and well known optical/electronic means, such as using a scanning optical filter, miniature spectrometer, or other approach well known in the art.

Figure 5:
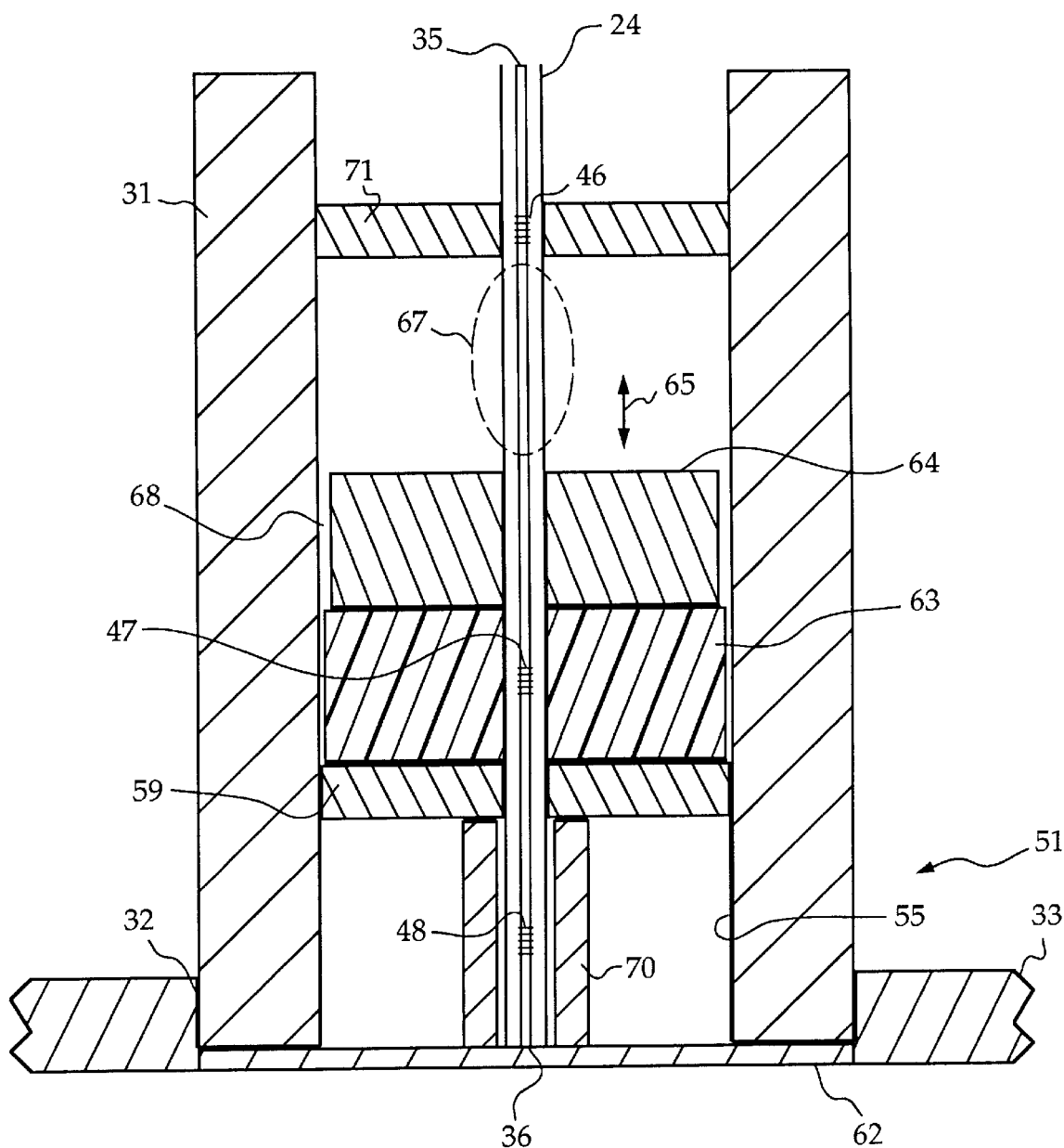
FIG. 5 is a schematic block diagram of a third embodiment of the fiber optic intrinsic sensor of FIG. 1.

Referring to FIG. 5, in a third embodiment of the invention the pressure sensor 52 may utilize a thin wall, rigid tube 70 in the cavity 55 formed between the rigid member 59 and the distal end 36 of the capillary tube 31. In order to properly transmit the pressure as reflected by movement of the diaphragm 62, the distal end 36 of the fiber 24 may be bonded to the diaphragm 62 at an attachment point 69 such that movement of the diaphragm 62 is directly translated to the optical fiber 24 and the Bragg grating 48. The rigid member 59, being bonded to both the internal surfaces of the tube 31 and the surface of the optical fiber 24, prevents the strain placed on the fiber 24 by the diaphragm 62 from being transmitted to the remainder of the fiber 24. As discussed above with respect to the second embodiment in FIG. 4, the fiber 24 may be placed under an initial bias tension in the third embodiment of FIG. 5.

Although the invention has been described and illustrated with respect to exemplary embodiments thereof, the foregoing and various other additions and omissions may be made therein and thereto without departing from the spirit and scope of the present invention.

We claim:

1. A multi-parameter sensor for sensing at least one of a plurality of measurand fields in an environment, comprising:

a tubularly enclosed optical fiber having a reference means in contact with a reference location in said optical fiber for isolating said reference location in said optical fiber from mechanically induced strain; and Bragg grating sensing means, positioned with respect to said reference means, responsive to an optical signal and to a strain associated with a respective measurand field for providing an optical sensing signal related to a magnitude of said respective measurand field.

2. A multi-parameter sensor according to claim 1, further comprising:

displacement means, spaced apart from said reference location, for placing an axial force on said optical fiber; and wherein said Bragg grating sensing means is positioned within said optical fiber between said reference location and said displacement means; and wherein said optical fiber is responsive to said axial force for providing said respective strain in said Bragg grating sensing means.

3. A multi-parameter sensor according to claim 2:

wherein said displacement means includes a diaphragm, spaced apart from said reference means, responsive to pressure in the environment for moving a measurement distance;

wherein said optical fiber extends between said diaphragm and said reference means and said Bragg grating sensing means is positioned in said optical fiber between said diaphragm and said reference means;

said optical fiber being responsive to said measurement distance for providing said strain in said Bragg grating sensing means; and wherein said respective measurand field is a pressure gradient field.

4. A multi-parameter sensor according to claim 3, wherein said reference means includes a rigid element attached between said optical fiber and a capillary tube forming said tubularly enclosed optical fiber.

5. A multi-parameter sensor according to claim 4, further comprising resiliently deformable means positioned within said capillary tube between said diaphragm and said rigid element, said optical fiber passing through said resiliently deformable means.

6. A multi-parameter sensor according to claim 2:
   wherein said displacement means includes:
      resiliently deformable means mounted to said reference means; and
      a proof mass, mounted to said resiliently deformable means;
   wherein said optical fiber is mounted between said reference means and said proof mass, and said Bragg grating sensing means is positioned within said resiliently deformable means;
   wherein said proof mass is responsive to an acceleration force in the environment for providing a vibration force, and wherein said resiliently deformable means is responsive to said vibration force for providing said respective strain in said Bragg grating sensing means; and
   said Bragg grating sensing means being responsive said optical signal and said respective strain for providing said optical sensing signal.

7. A multi-parameter sensor according to claim 6, wherein said reference means includes a rigid element attached between said optical fiber and a capillary tube forming said tubularly enclosed optical fiber.

8. A multi-parameter sensor according to claim 2, wherein said reference means includes a rigid element attached between said optical fiber and a capillary tube forming said tubularly enclosed optical fiber.

9. A multi-parameter sensor according to claim 1, wherein said Bragg grating sensing means is located within said reference means at said reference location, and wherein said respective measurand field is a temperature field.

10. A multi-parameter sensor according to claim 9, wherein said reference means includes a rigid element attached between said optical fiber and a capillary tube forming said tubularly enclosed optical fiber.

11. A multi-parameter sensor according to claim 1, wherein said Bragg grating sensing means includes a plurality of Bragg grating sensors each located within a respective reference means at a respective reference location, and wherein said respective measurand field is a temperature gradient field.

12. A multi-parameter sensor for sensing a plurality of measurand fields in an environment, comprising:
   a tubularly enclosed optical fiber having at least one reference means in contact with a respective reference location in said optical fiber for isolating said respective reference location in said optical fiber from mechanically induced strain; and
   a plurality of Bragg grating sensing means, each positioned with respect to a respective reference means, each responsive to an optical signal and to a strain associated with a respective measurand field for providing a respective optical sensing signal related to a magnitude of said respective measurand field.

13. A multi-parameter sensor according to claim 12, wherein a first one of said Bragg grating sensing means is located within a first one of said reference means for providing a first optical sensing signal related to a magnitude of a first measurand field which is a temperature gradient field.

14. A multi-parameter sensor according to claim 13, further comprising:
   at least one displacement means, spaced apart from a second reference means positioned at a second reference location, for placing an axial force on said optical fiber; and
   wherein at least one additional Bragg grating sensing means is positioned within said optical fiber between said second reference location and said at least one displacement means; and
   wherein said optical fiber is responsive to said axial force for straining said at least one additional Bragg grating sensing means.

15. A multi-parameter sensor according to claim 14, wherein said at least one displacement means includes a diaphragm, spaced apart from said second reference means, responsive to pressure in the environment for moving a measurement distance;
   wherein said optical fiber extends between said diaphragm and one side of said second reference means and said at least one additional Bragg grating sensing means includes a second Bragg grating sensing means positioned in said optical fiber between said diaphragm and said second reference means;
   said optical fiber being responsive to said measurement distance for straining said second Bragg grating sensing means.

16. A multi-parameter sensor according to claim 15:
   wherein said at least one displacement means further includes:
      resiliently deformable means mounted to another side of said second reference means; and
      a proof mass, mounted to said resiliently deformable means;
   wherein said optical fiber is mounted between said second reference means and said proof mass, and wherein said at least one additional Bragg grating sensing means further includes a third Bragg grating sensing means positioned within said resiliently deformable means;
   wherein said proof mass is responsive to an acceleration force in the environment for providing a vibration force, and wherein said resiliently deformable means is responsive to said vibration force for straining said third Bragg grating sensing means.

17. A multi-parameter sensor according to claim 16, wherein each said reference means includes a rigid element attached between said optical fiber and a capillary tube forming said tubularly enclosed optical fiber.

18. A multi-parameter sensor according to claim 14:
   wherein said at least one displacement means includes:
      resiliently deformable means mounted to said second reference means; and
      a proof mass, mounted to said resiliently deformable means;
   wherein said optical fiber is mounted between said second reference means and said proof mass, and said at least one additional Bragg grating sensing means is positioned within said resiliently deformable means;
   wherein said proof mass is responsive to an acceleration force in the environment for providing a vibration force, and wherein said resiliently deformable means is responsive to said vibration force for straining said at least one additional Bragg grating sensing means.

19. A multi-parameter sensor according to claim 18, wherein each said reference means includes a rigid element attached between said optical fiber and a capillary tube forming said tubularly enclosed optical fiber.

20. A multi-parameter sensor according to claim 12, further comprising:
   at least one displacement means, spaced apart from said at least one reference means, for placing an axial force on said optical fiber; and
   wherein at least one Bragg grating sensing means is positioned within said optical fiber between said at least one reference means and said at least one displacement means; and
   wherein said optical fiber is responsive to said axial force for straining said at least one Bragg grating sensing means.

21. A multi-parameter sensor according to claim 20, wherein said at least one displacement means includes a diaphragm, spaced apart from said at least one reference means, responsive to pressure in the environment for moving a measurement distance;
   wherein said optical fiber extends between said diaphragm and one side of said at least one reference means and said at least one Bragg grating sensing means includes a first Bragg grating sensing means positioned in said optical fiber between said diaphragm and said at least one reference means;
   said optical fiber being responsive to said measurement distance for straining said first Bragg grating sensing means.

22. A multi-parameter sensor according to claim 21, wherein said at least one displacement means further includes:
   resiliently deformable means mounted to another side of said at least one reference means; and
   a proof mass, mounted to said resiliently deformable means;
   wherein said optical fiber is mounted between said at least one reference means and said proof mass, and wherein said at least one Bragg grating sensing means further includes a second Bragg grating sensing means positioned within said resiliently deformable means;
   wherein said proof mass is responsive to an acceleration force in the environment for providing a vibration force, and wherein said resiliently deformable means is responsive to said vibration force for straining said second Bragg grating sensing means.

23. A multi-parameter sensor according to claim 22, wherein each said reference means includes a rigid element attached between said optical fiber and a capillary tube forming said tubularly enclosed optical fiber.

24. A multi-parameter sensor according to claim 20:
   wherein said at least one displacement means includes:
      resiliently deformable means mounted to said at least one reference means; and
      a proof mass, mounted to said resiliently deformable means;
   wherein said optical fiber is mounted between said at least one reference means and said proof mass, and said at least one Bragg grating sensing means is positioned within said resiliently deformable means;
   wherein said proof mass is responsive to an acceleration force in the environment for providing a vibration force, and wherein said resiliently deformable means is responsive to said vibration force for straining said at least one Bragg grating sensing means.

25. A multi-parameter sensor according to claim 24, wherein each said reference means includes a rigid element attached between said optical fiber and a capillary tube forming said tubularly enclosed optical fiber.

26. A sensor for sensing at least one of a plurality of measurand fields in an environment, comprising:
   an optical fiber having a reference device in contact with a reference location in said optical fiber for isolating said reference location in said optical fiber from mechanically induced strain; and
   a Bragg grating formed within said optical fiber and positioned with respect to said reference device, said Bragg grating being responsive to an optical signal and to a strain associated with a respective measurand field for providing an optical sensing signal related to a magnitude of said respective measurand field.

27. A sensor according to claim 26, further comprising:
   a displacement device, spaced apart from said reference location, for placing an axial force on said optical fiber; and
   wherein said Bragg grating is positioned between said reference location and said displacement device; and
   wherein said optical fiber is responsive to said axial force for providing said respective strain in said Bragg grating.

28. A sensor according to claim 27:
   wherein said displacement device includes a diaphragm, spaced apart from said reference device, responsive to pressure in the environment for moving a measurement distance;
   wherein said optical fiber extends between said diaphragm and said reference device and said Bragg grating is positioned between said diaphragm and said reference device;
   said optical fiber being responsive to said measurement distance for providing said strain in said Bragg grating; and
   wherein said respective measurand field is a pressure gradient field.

29. A sensor according to claim 28, wherein said reference device includes a rigid element attached between said optical fiber and a capillary tube surrounding said optical fiber.

30. A sensor according to claim 29, further comprising a resiliently deformable element positioned within said capillary tube between said diaphragm and said rigid element, said optical fiber passing through said resiliently deformable element.

31. A sensor according to claim 27:
   wherein said displacement device includes:
      a resiliently deformable element mounted to said reference device; and
      a proof mass, mounted to said resiliently deformable element;
   wherein said optical fiber is mounted between said reference device and said proof mass, and said Bragg grating is positioned within said resiliently deformable element;
   wherein said proof mass is responsive to an acceleration force in the environment for providing a vibration force, and wherein said resiliently deformable element is responsive to said vibration force for providing said respective strain in said Bragg grating; and
   said Bragg grating being responsive said optical signal and said respective strain for providing said optical sensing signal.

32. A sensor according to claim 31, wherein said reference device includes a rigid element attached between said optical fiber and a capillary tube surrounding said optical fiber.

33. A sensor according to claim 27, wherein said reference device includes a rigid element attached between said optical fiber and a capillary tube surrounding said optical fiber.

34. A sensor according to claim 26, wherein said Bragg grating is located within said reference device at said reference location, and wherein said respective measurand field is a temperature field.

35. A sensor according to claim 34, wherein said reference device includes a rigid element attached between said optical fiber and a capillary tube surrounding said optical fiber.

36. A sensor according to claim 26, further comprising at least one additional Bragg grating, each Bragg grating being located within a respective reference device at a respective reference location, and wherein said respective measurand field is a temperature gradient field.

* * * * *